(12) United States Patent
Tenor

(10) Patent No.: US 12,433,278 B1
(45) Date of Patent: Oct. 7, 2025

(54) ICE FISHING APPARATUS

(71) Applicant: Brad Tenor, Green Bay, WI (US)

(72) Inventor: Brad Tenor, Green Bay, WI (US)

( * ) Notice: Subject to any disclaimer, the term of this patent is extended or adjusted under 35 U.S.C. 154(b) by 0 days.

(21) Appl. No.: 18/897,553

(22) Filed: Sep. 26, 2024

(51) Int. Cl.
*A01K 97/01* (2006.01)
*A01K 97/11* (2006.01)

(52) U.S. Cl.
CPC .............. *A01K 97/01* (2013.01); *A01K 97/11* (2013.01)

(58) Field of Classification Search
CPC ................................ A01K 97/01; A01K 97/11
See application file for complete search history.

(56) References Cited

U.S. PATENT DOCUMENTS

| | | | | |
|---|---|---|---|---|
| 3,621,599 | A * | 11/1971 | Uhlich et al. | A01K 97/01 43/15 |
| 3,745,689 | A * | 7/1973 | Williams | A01K 97/01 43/17 |
| 4,031,651 | A * | 6/1977 | Titze | A01K 97/11 43/21.2 |
| 4,794,718 | A * | 1/1989 | Tillman | A01K 97/01 43/16 |
| 4,823,494 | A * | 4/1989 | Waterman | A01K 97/01 43/16 |
| 4,953,317 | A * | 9/1990 | Ruchel | A01K 97/01 43/17 |
| 5,598,656 | A * | 2/1997 | Strasser | A01K 97/01 43/17 |
| 5,896,694 | A | 4/1999 | Midha | |
| 11,406,094 | B1 * | 8/2022 | Barnell | A01K 97/10 |
| 11,484,019 | B1 * | 11/2022 | Zierden | E04H 15/001 |
| 11,903,374 | B1 | 2/2024 | Groth | |
| 2017/0064937 | A1 * | 3/2017 | Christianson | A01K 97/01 |
| 2017/0265446 | A1 * | 9/2017 | Dungan | A01K 99/00 |
| 2018/0206469 | A1 * | 7/2018 | Dungan | A01K 97/01 |
| 2018/0259114 | A1 * | 9/2018 | Kor | F25D 3/02 |
| 2023/0070991 | A1 * | 3/2023 | Makos | A01K 97/01 |
| 2023/0380398 | A1 * | 11/2023 | Sahli | A01K 97/01 |

* cited by examiner

*Primary Examiner* — Richard G Davis

(74) *Attorney, Agent, or Firm* — Sanchelima & Associates, P.A.; Jesus Sanchelima; Christian Sanchelima

(57) ABSTRACT

An ice fishing apparatus including a bucket assembly and an activation mechanism assembly. The bucket assembly includes a bucket with flap members hingedly attached to the top opening of the bucket. The bucket assembly has a spring to release the flap members. The activation assembly includes a spring biased mechanism with a trigger rod engaged thereto. The trigger rod has a notch to engage a fishing line with a hook. The spring biased mechanism is automatically released when the hook is bitten. The spring biased mechanism automatically sets the hook of a fishing rod.

10 Claims, 6 Drawing Sheets

ICE FISHING APPARATUS

BACKGROUND OF THE INVENTION

1. Field of the Invention

The present invention relates to ice fishing apparatus and, more particularly, to an ice fishing apparatus that has a bucket to cover an ice fishing hole. The bucket has at least two flaps with a spring biased mechanism that sets the hook of a fishing rod when a fish bites the hook.

2. Description of the Related Art

Several designs for ice fishing apparatus have been designed in the past. None of them, however, include an ice fishing apparatus that has a bucket with flaps hingedly attached thereto, the bucket has a pole holder to hold the fishing rod, the fishing line is set when a spring biased mechanism is activated and the flaps are opened up.

Applicant believes that a related reference corresponds to U.S. Pat. No. 11,903,374 issued for a fishing rod holding device with a base assembly and spring mechanism that is used to automatically set a hook during ice fishing. Applicant believes that another related reference corresponds to U.S. Pat. No. 5,896,694 issued for an adjustable ice fishing tip-up that is configured to span an ice fishing hole and has a spring biasing mechanism. None of these references, however, teach of an ice fishing apparatus that is comprised of a bucket-like device with deployable flap members that are configured to secure the device over an ice fishing hole, where the device has a spring biased mechanism which is used to automatically set the hook of a fishing rod when a fish bites.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an ice fishing apparatus that has a bucket-like device to cover an ice fishing hole to avoid the freeze from coming out of the ice fishing hole while fishing.

It is another object of this invention to provide an ice fishing apparatus that has a spring biased mechanism to automatically set the hook of a fishing line when a fish bites the hook.

It is still another object of the present invention to provide an ice fishing apparatus that includes a pole holder to hold the fishing rod thereto.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
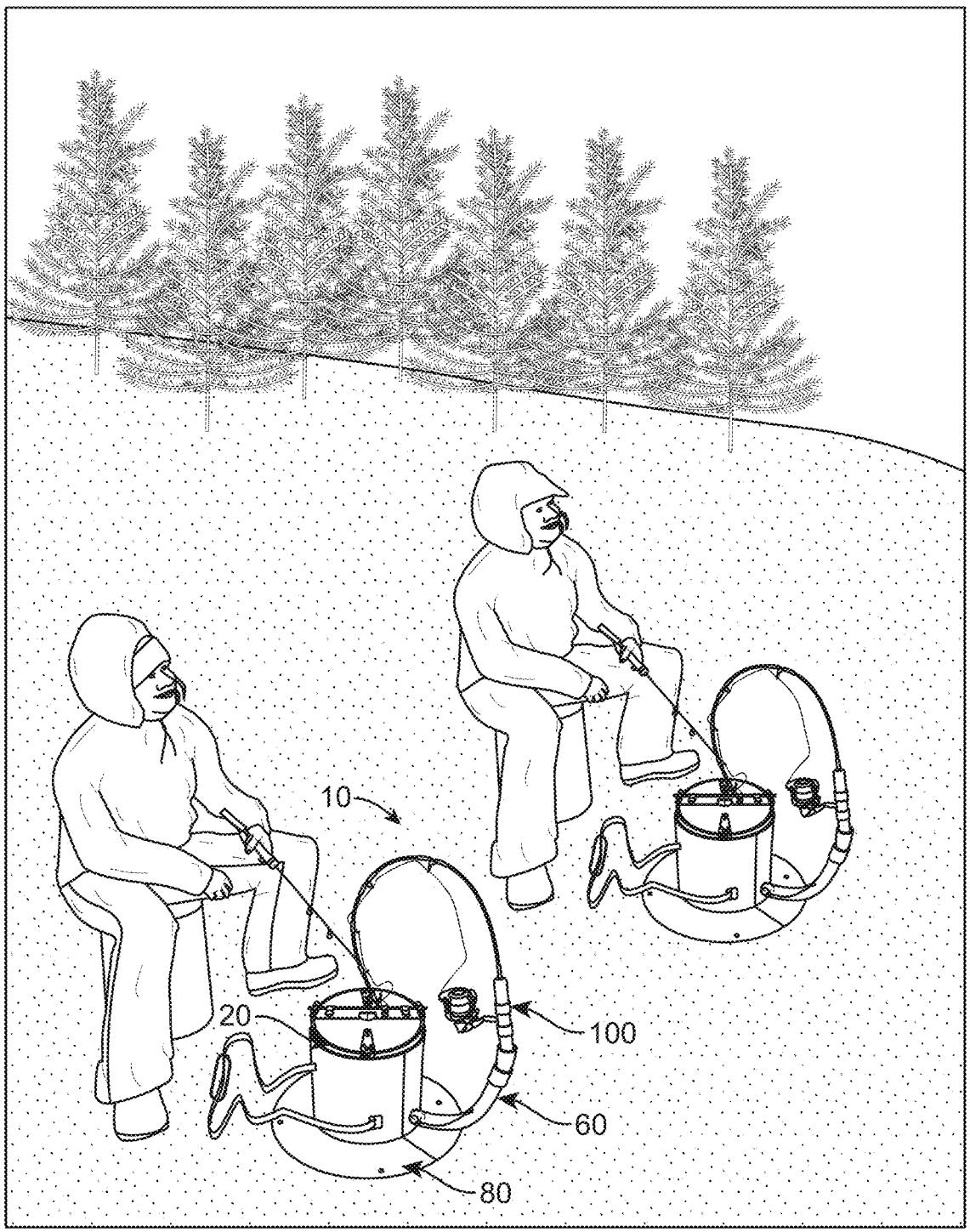
FIG. 1 represents an isometric operational view of the present invention 10 showing a bucket assembly 20 covering an ice fishing hole.

Referring now to the drawings, where the present invention is generally referred to with numeral 10, it can be observed that it basically includes a bucket assembly 20, a activation mechanism assembly 40 and a holder assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
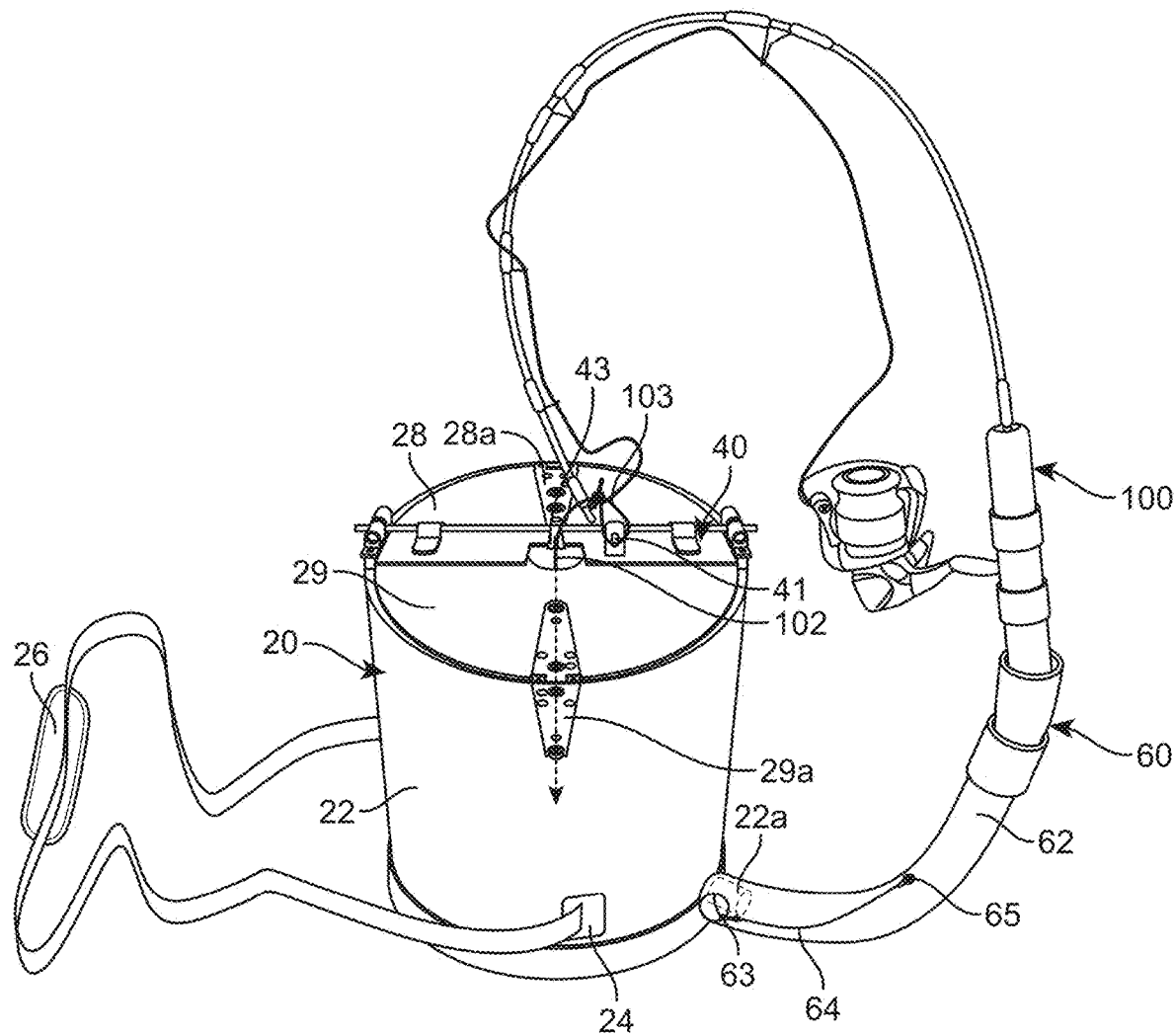
FIG. 2 shows an isometric view of the present bucket assembly 20 with the holder assembly 60 holding the fishing rod 100.

Best observed in FIG. 2, the bucket assembly 20 includes a bucket 22 with at least a first flap 28 and a second flap 29. In one of the preferred embodiments, the bucket 22 may have a substantially cylindrical shape. It also may be suitable to have the bucket 22 with other shapes such as cuboid shape or any other suitable shape. In one embodiment, the bucket 22 may be made of plastic. It also may be suitable to have the bucket 22 made of any other suitable material. The bucket 22 may have a coating to avoid rusting and weather damage. The bucket 22 may be entirely hollow with a top opening and a bottom opening. The bottom opening of the bucket 22 may be placed on an ice opening for ice fishing. The top opening and the bottom openings may be circular.

The first flap 28 and the second flap 29 may have a half-circle shape of a radius substantially similar to the radius of the bucket 22. The first flap 28 and the second flap 29 may have an area that allows covering the top opening of the bucket 22. The second flap 29 may have an arc portion and a straight portion with a cut at a middle of the straight portion to allow a fishing line to cross therethrough. The first flap 28 and the second flap 29 may be made of a plastic or any other suitable material. The first flap 28 and the second flap 29 may have a protective coating to prevent rust.

The first flap 28 may be hingedly attached to an edge of the top opening of the bucket 22 by a first hinge 28a. The first hinge 28a may be secured to the first flap 28 and to an outer portion of the bucket using fasteners such as but not limited to rivets, bolts, screws, or the like. It also may be suitable to use a glue to attach the first hinge 28a to the first flap 28 and bucket 22. The first hinge 28a may allow opening the first flap 28 upwards. The second flap 29 may be hingedly attached to an edge of the top opening opposite to the first hinge 28a. The second flap 29 may be attached to the bucket 22 by a second hinge 29a. The second hinge 29a may be secured to the second flap 29 and to an outer portion of the bucket 22 using fasteners such as but not limited to rivets, bolts, screws, or the like. It also may be suitable to use a glue to attach the second hinge 29a to the second flap 29 and bucket 22. The second hinge 29a may allow opening the second flap 29 upwards.

The bucket assembly 20 may further include a first spring 28b and a second spring 29b, The first spring 28b and the second spring 29b may be hammer springs. The first spring 28b may be located on an upper internal portion of the bucket 22 in an actuation plane parallel to the first hinge 28a. The first spring 28b may have the potential energy to automatically push the first flap 28 upwards when the first flap 28 is released. The second spring 29b may be located on an upper internal portion of the bucket 22 opposite to the first spring 28b. The second spring 29b may have the potential energy to automatically push the second flap 29 upwards when the second flap 29 is released.

The bucket 22 may have attaching portions 24 to attach a strap 26 thereto. The strap 26 may allow to easily transport the bucket 22. The bucket 22 may have an attaching member 22a located at a bottom outer portion of the bucket 22. The holder assembly 60 may include a holding member 62. The holding member 62 may be a J-shaped tubular member as observed in FIG. 2. The holding member 62 may be engaged to the attaching member 22a. The holding member 62 may be secured to the attaching member 22a by a lock member 63. The lock member 63 may be secured to a cord 64 attached to the holding member 62 by a fastener 64. The holding member 62 may have a top opening to receive a fishing rod 100 thereinside when fishing in an ice hole.

Figure 3:
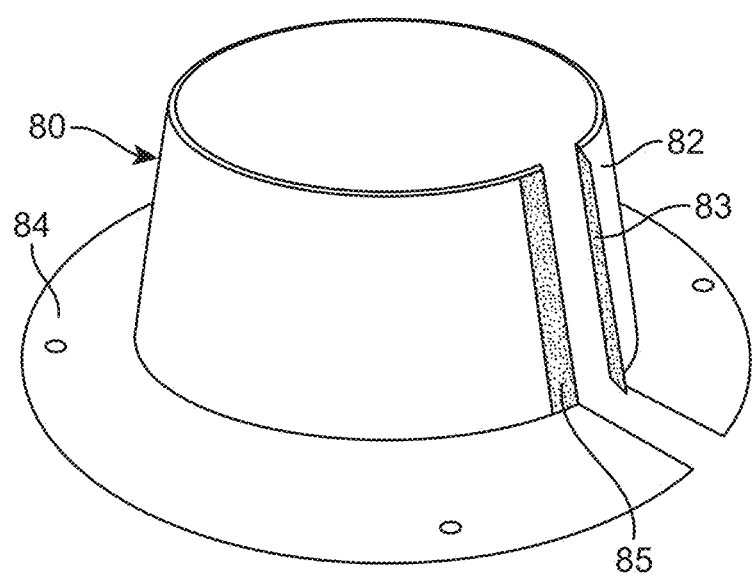
FIG. 3 illustrates an isometric view of the cover assembly 80.

Referring now to FIG. 3, a cover assembly 80 may be provided to cover the bucket assembly 20 to isolate the bucket assembly 20 from freezing. The cover assembly 80 may include a top cover and a bottom portion 84. The top cover may be made of an insulating flexible material. The top cover may cover the external lateral portion of the bucket assembly 20 as observed in FIG. 1. The bottom portion 84 may have holes to secure the cover assembly 80 to the ground. The top cover may have hook fasteners 83 and loop fasteners 85 or any other suitable type of fasteners to secure the cover assembly 80 to the bucket assembly 20.

Figure 4:
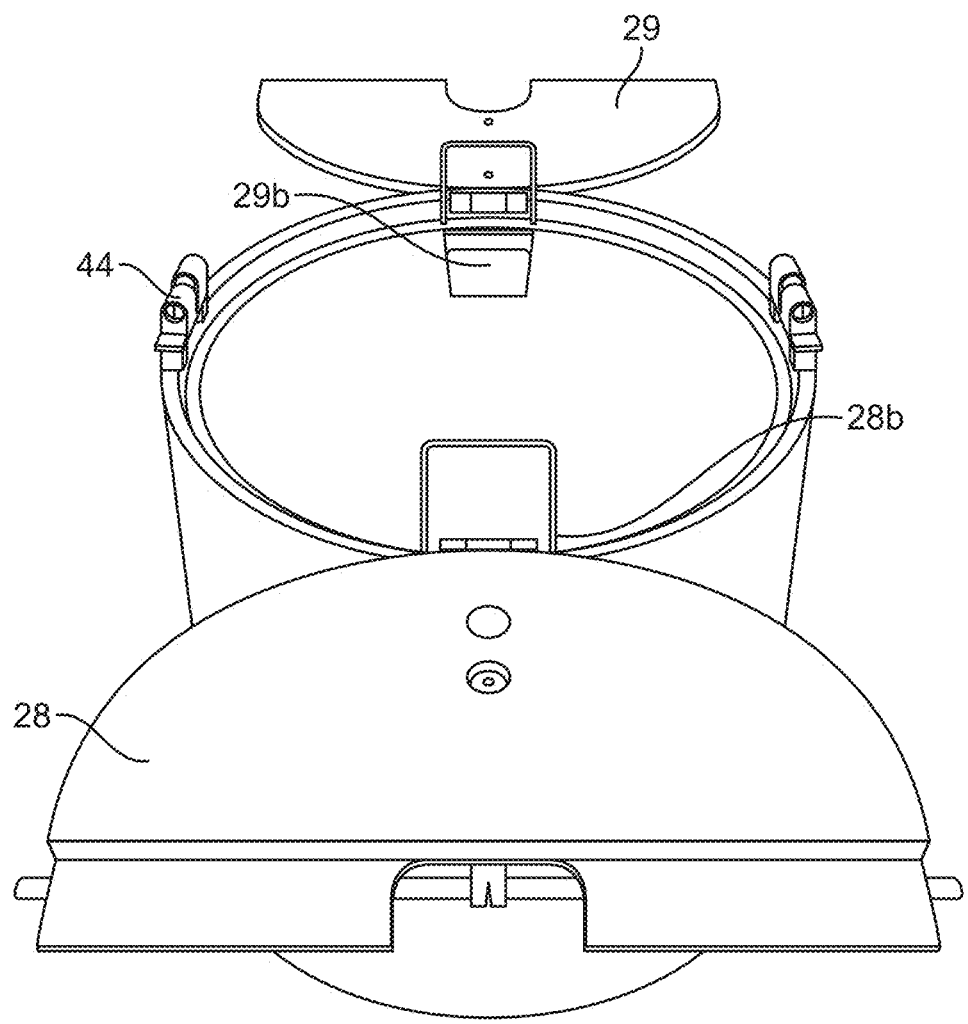
FIG. 4 is a representation of an isometric view of the first flap 28 and second flap 29 in an open configuration.

The activation mechanism assembly 40 may be integrated to the bucket assembly 20. The activation mechanism assembly 40 may include a strip support 42 attached to a top edge of the first flap 28 as observed in FIG. 4. A central portion of the strip support 42 may have a cutout to allow a fishing line 102 to cross therethrough to the interior of the bucket 22 and to the ice hole. The strip support 42 may be attached to the first flap 28 with rivets, bolts, screws or any other suitable type of fastening. The activation mechanism assembly 40 may further include spring biased mechanisms 44. In one of the preferred embodiments, two spring biased mechanisms 44 may be attached to a opposite top edged of the bucket 22 as observed in FIG. 5.

Each of the spring biased mechanisms 44 may have a bar 44a with holes 44b to secure the spring biased mechanisms 44 to the bucket 22. Each of the spring biased mechanisms 44 may have housings 44c to enclose a spring 48, a ball 49 and a adjusting screw 47. In one embodiment, each of the spring biased mechanisms 44 may have two housings 44c with the ball 49 located on internal ends of the housings 44c. Each of the housings 44c may have the adjusting screw 47 at an external end, the ball 49 at an internal end, and the spring 48 located within the adjusting screw 47 and the ball 49. The ball 49 of each of the housings 44c may be pushed by the spring 48 towards the center of the spring biased mechanisms 44. The adjusting screw 47 may allow to compress or loose the spring 48 to adjust the strength of the ball 49 to secure an object such as a rod between the balls 49. The activation mechanism assembly 40 may further include a clip member 41 to engage a loop 103 of the fishing line 102. The clip member 41 may be attached to the strip support 42 in a portion near the cutout portion of the strip support 42.

Figure 5:
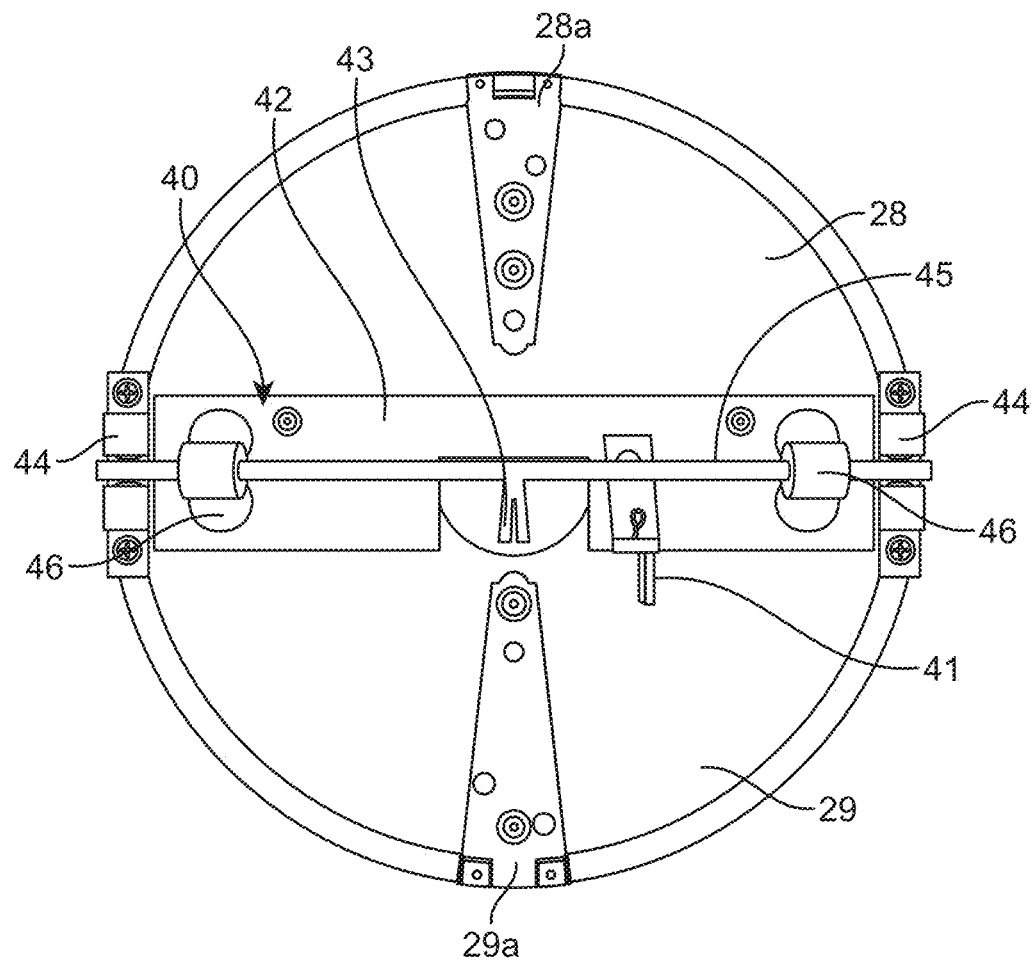
FIG. 5 is a top view of the activation mechanism assembly 40.
Figure 6:
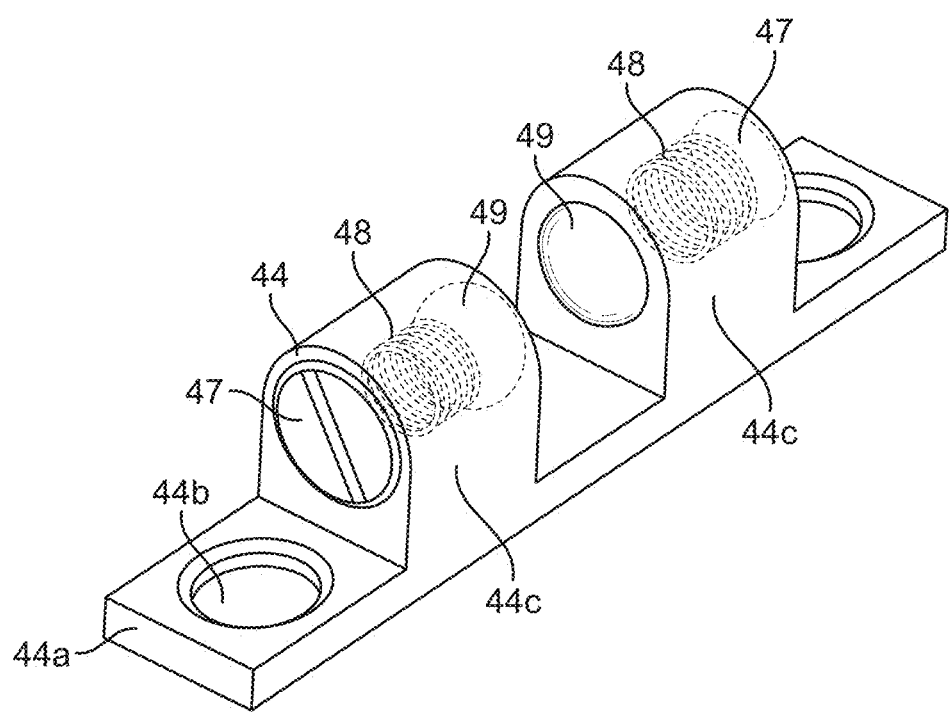
FIG. 6 is an enlarged view of the spring biased mechanisms 44.

The activation mechanism assembly 40 may further include a trigger rod 45 with a notch 43 as observed in FIG. 5. The trigger rod 45 may be an elongated rod. The trigger rod 45 may have a length similar to a diameter of the bucket 22. The trigger rod 45 may be made of a metal or any other suitable material. The trigger rod 45 may have a coating. The trigger rod 45 may be secured to the strip support 42 by holders 46. The holders 46 may allow the trigger rod 45 to rotate around a major axis of the trigger rod 45. The trigger rod 45 may have a first end secured on a first of the spring biased mechanisms 44 between the balls. A second end of the trigger rod 45 may be secured between the balls of a second of the spring biased mechanisms 44. The notch 43 may be located at a middle portion of the trigger rod 45.

The trigger rod 45 may allow to close and secure the first flap 28 and second flap 29. The second flap 29 may be pushed downwardly and covered by the strip support 42 of the first flap 28. The trigger rod 45 may be secured by the spring biased mechanisms 44 to secure the first flap 28 and the second flap 29 in a closed configuration as observed in FIG. 5. The loop 103 of a fishing line 102 may be engaged to the clip member 41. The fishing line 102 may be engaged to the notch 43 when the first flap 28 and the second flap 29 are in a closed position with the fishing line 102 introduced in an ice hole for fishing. When a fish bites the hook of a fishing line 102, the fishing line 102 may be pulled down along with the notch 43 being pulled down. When the notch 43 is pulled down, the notch 43 makes the trigger rod 45 to be released from the spring biased mechanisms 44 allowing the second spring 29b and the first spring 28b to push upwards the second flap 29 and the first flap 28 setting the fishing line 102.

The ice fishing apparatus may be used for a method for fishing in an ice hole, the method may include steps. A first step may include positioning the bucket assembly 20 over a fishing ice hole. A second step may be covering the bucket assembly 20 with the cover assembly 80 and securing the bottom portion 84 of the cover assembly 80 to ground. A third step may be attaching the holder assembly 60 to the attaching member 22a. A fourth step may be securing the fishing rod 100 in the holding member 62 of the holder assembly 60. A fifth step may be closing the first flap 28 and the second flap 29 and securing the trigger rod 45 to the spring biased mechanisms 44 to secure the second flap 29 and first flap 28 in the closed position. A sixth step may be inserting the fishing line 102 with a hook inside an opening between the first flap 28 and second flap 29 and inside the fishing ice hole. A seventh step may be engaging the loop 103 to the clip member 41 and engaging the fishing line 102 to the notch 43. An eight step may be releasing the trigger rod 45 by the spring biased mechanisms 44 to set of the the hook of the fishing line 102.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An ice fishing apparatus, comprising:
   a) a bucket assembly including a bucket-like device with deployable flap members; and
   b) an activation assembly including a spring biased mechanism to automatically set a hook on a fishing rod when the hook is bitten.

2. The ice fishing apparatus set forth in claim 1, wherein the deployable flap members include a first flap and a second flap hingedly attached to a top opening of the bucket-like device.

3. The ice fishing apparatus set forth in claim 1, wherein the bucket assembly further includes a first spring and a second spring located on upper internal portions of the bucket-like device to automatically push the deployable flap members upwards when released.

4. The ice fishing apparatus set forth in claim 1, wherein the bucket assembly further includes a strap attached thereto.

5. The ice fishing apparatus set forth in claim 1 further including a holder assembly, said holder assembly includes a holding member removably attached to the bucket-like device.

6. The ice fishing apparatus set forth in claim 5, wherein the holding member is a J-shaped tubular member, said holding member removably receives a fishing rod therein.

7. The ice fishing apparatus set forth in claim 1 further including a cover assembly to isolate the bucket assembly from freezing, said cover assembly has hook and loop fasteners to be secured in the bucket assembly.

8. The ice fishing apparatus set forth in claim 1, wherein the activation assembly further includes a clip member and a trigger rod with a notch, said clip member allows to engage a loop of a fishing line thereto, said trigger rod is secured to the spring biased mechanism, said notch secures the fishing line, said trigger rod is released when the hook is bitten allowing the deployable flaps to be released.

9. An method for fishing in an ice hole, comprising:
   a) positioning a bucket assembly over a fishing hole, said bucket assembly including a first flap and a second flap;
   b) covering the bucket assembly with a cover assembly;
   c) attaching a holder assembly to the bucket assembly;
   d) securing a fishing rod to the holder assembly;
   e) closing the first flap and the second flap and securing a trigger rod to a spring biased mechanism to secure the second flap and first flap in a closed position;
   f) inserting a fishing line of the fishing rod inside an opening between the first flap and the second flap and inside the fishing ice hole;
   g) engaging a loop of the fishing line to a clip member and engaging the fishing line to ta notch of a trigger rod; and
   h) releasing the trigger rod by the spring biased mechanism to set of the a hook of the fishing line.

10. An ice fishing apparatus, consisting of:
   a) a fishing rod with a fishing line, said fishing line has a loop and a hook;
   b) a bucket assembly including a bucket, a first flap, a second flap and a strap, said bucket has a cylindrical shape, said bucket has a top opening and a bottom opening, said strap is attached to the bucket, said first flap and said second flap are hingedly attached to opposite top edges of the bucket, the bucket assembly further includes a first spring and a second spring located on upper internal portions of the bucket to automatically push the first flap and the second flap upwards when released;
   c) a holder assembly, said holder assembly includes a holding member removably attached to the bucket, said holding member is a J-shaped tubular member, said holding member removably receives the fishing rod therein;
   d) a cover assembly to isolate the bucket assembly from freezing, said cover assembly has hook and loop fasteners to be secured in the bucket assembly; and
   e) an activation assembly including two spring biased mechanisms, a clip member and a trigger rod with a notch, said clip member allows to engage a loop of a fishing line thereto, said trigger rod is secured to the spring biased mechanisms, said notch secures the fishing line, said trigger rod is released when the hook is bitten allowing the first flap and the second flap to be released and automatically set the hook of the fishing rod.

* * * * *